United States Patent
Kennedy

(10) Patent No.: US 8,746,655 B1
(45) Date of Patent: Jun. 10, 2014

(54) ACTUATOR FOR BUTTERFLY VALVES

(71) Applicant: Kennedy Valve Company, Elmira, NY (US)

(72) Inventor: Paul Kennedy, Horseheads, NY (US)

(73) Assignee: Kennedy Valve Company, Elmira, NY (US)

( * ) Notice: Subject to any disclaimer, the term of this patent is extended or adjusted under 35 U.S.C. 154(b) by 0 days.

(21) Appl. No.: 13/769,523

(22) Filed: Feb. 18, 2013

(51) Int. Cl.
  *F16K 31/02* (2006.01)
(52) U.S. Cl.
  USPC ........................................ 251/249.5; 251/305
(58) Field of Classification Search
  USPC ............................... 251/249.5, 305–308, 366
  See application file for complete search history.

(56) References Cited

U.S. PATENT DOCUMENTS

| | | | | |
|---|---|---|---|---|
| 3,425,439 | A | * | 2/1969 | Duffey et al. ................. 251/306 |
| 4,008,877 | A | * | 2/1977 | Yasuoka et al. .............. 251/305 |
| 4,220,270 | A | * | 9/1980 | Szadkowski ............... 251/249.5 |
| 4,616,803 | A | * | 10/1986 | Schils ........................ 251/249.5 |
| 6,766,709 | B1 | * | 7/2004 | West et al. ................. 251/249.5 |
| 7,090,193 | B2 | * | 8/2006 | Kamesawa .................... 251/305 |
| 7,182,314 | B2 | * | 2/2007 | Harvey et al. ............. 251/249.5 |
| 2009/0072179 | A1 | * | 3/2009 | Swartzentruber et al. . 251/249.5 |

* cited by examiner

*Primary Examiner* — John Bastianelli
(74) *Attorney, Agent, or Firm* — Brown & Michaels, PC

(57) ABSTRACT

An actuator for a butterfly valve, having a gearbox, an actuator stem and a handle. The actuator stem is formed as a single piece, comprising a position indicator, seal disc, worm gear, and stem shaft with splines for fitting into the valve. The handle is also formed as a single piece, comprising the wheel or knob, shaft, and worm for operating the worm gear. By forming the gearbox as a single piece as well, the entire actuator can be made as three major pieces. Optionally, the gearbox can be formed with cylindrical fittings which press-fit over pins on the valve, replacing the conventional mounting bracket.

9 Claims, 4 Drawing Sheets

ACTUATOR FOR BUTTERFLY VALVES

BACKGROUND OF THE INVENTION

1. Field of the Invention

The invention pertains to the field of valve actuators. More particularly, the invention pertains to actuator for butterfly or similar valves.

2. Description of Related Art

Butterfly valves are quarter-turn type shut-off valves in which a flat disc is turned within a pipe to control fluid flow through the pipe. A shaft passes through the pipe and the disc to rotate the disc, typically through a range of 90° of rotation. Similar quarter turn valves such as ball valves and plug valves operate similarly, using balls and cylinders instead of discs to shut off fluid flow.

The prior art design of actuator for butterfly valves is shown in FIG. 1, in which 1 is the section of pipe forming the outside of the valve and 2 is the disc or butterfly.

In prior art designs, an actuator is typically made up of many parts which need to be assembled into the actuator.

The actuator gearbox 6 is typically mounted to the valve 1 by a bracket 5 which is secured by bolts 4 around a packing nut 3 which allows the shaft 7 to pass through the valve body 1 and disc 2. A worm assembly 9 bearing a quadrant worm gear 8 attaches to the top of the shaft 7, and a valve position indicator 11, usually in the form of a flag as shown, is attached to the top of the worm assembly 9. A handle shaft 12, bearing a worm 13, is inserted through the side of the gearbox 6 to actuate the worm gear 9, which in turn turns the shaft 7 and rotates the disc 2 to operate the valve. A separate handle or knob 15 is attached to the handle shaft 12 either by splines, threading or by tightening a setscrew. Once the parts are assembled, a gearbox cover 10 is fastened down to cover the gearbox 6.

A threaded hole 14 in a side of the gearbox 6 provides a mount for a position sensor (not shown), usually an electrical switch, which senses the position of the worm gear 8. The position sensor is conventional and does not form part of the invention.

Thus it can be seen that in the prior art design at least nine or ten parts must be manufactured and assembled for a single actuator assembly, not counting conventional fasteners, washers, seals, etc. as might be needed. The assembled actuator must then be assembled to the valve by the bracket and fasteners, as shown.

SUMMARY OF THE INVENTION

The invention presents an improved actuator for a butterfly valve, having a gearbox, an actuator stem and a handle. The actuator stem is formed as a single piece, comprising a position indicator, seal disc, worm gear, and stem shaft with splines for press-fitting into a bore in the valve disc. The handle is also formed as a single piece, comprising the wheel or knob, shaft, and worm for operating the worm gear. By forming the gearbox as a single piece as well, the entire actuator can be made as three pieces. Optionally, the gearbox can be formed with cylindrical fittings which press-fit over pins on the valve, replacing the conventional mounting bracket.

DETAILED DESCRIPTION OF THE INVENTION

Figure 1:
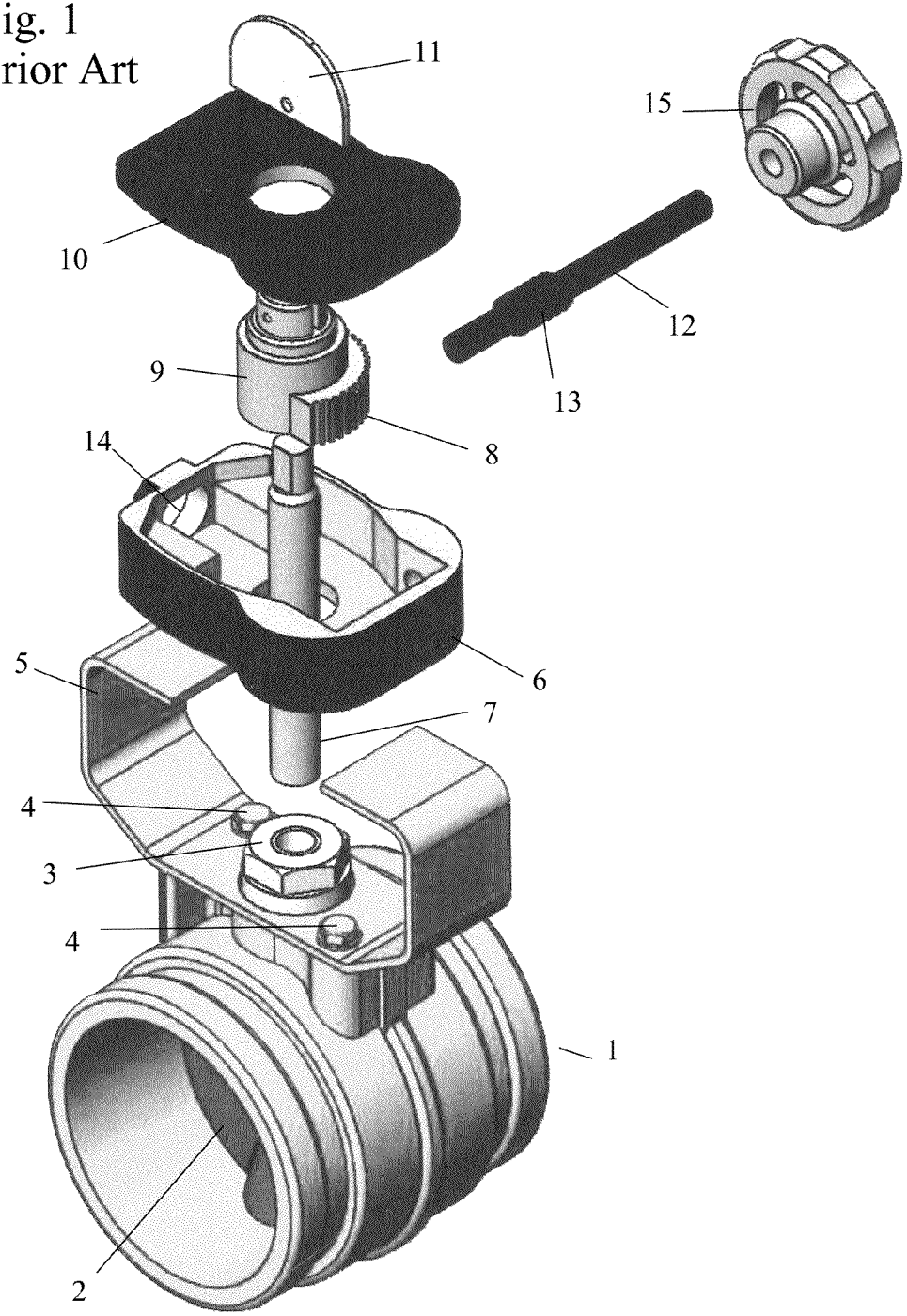
FIG. 1 shows an exploded perspective view of a prior art butterfly valve and actuator.
Figure 2:
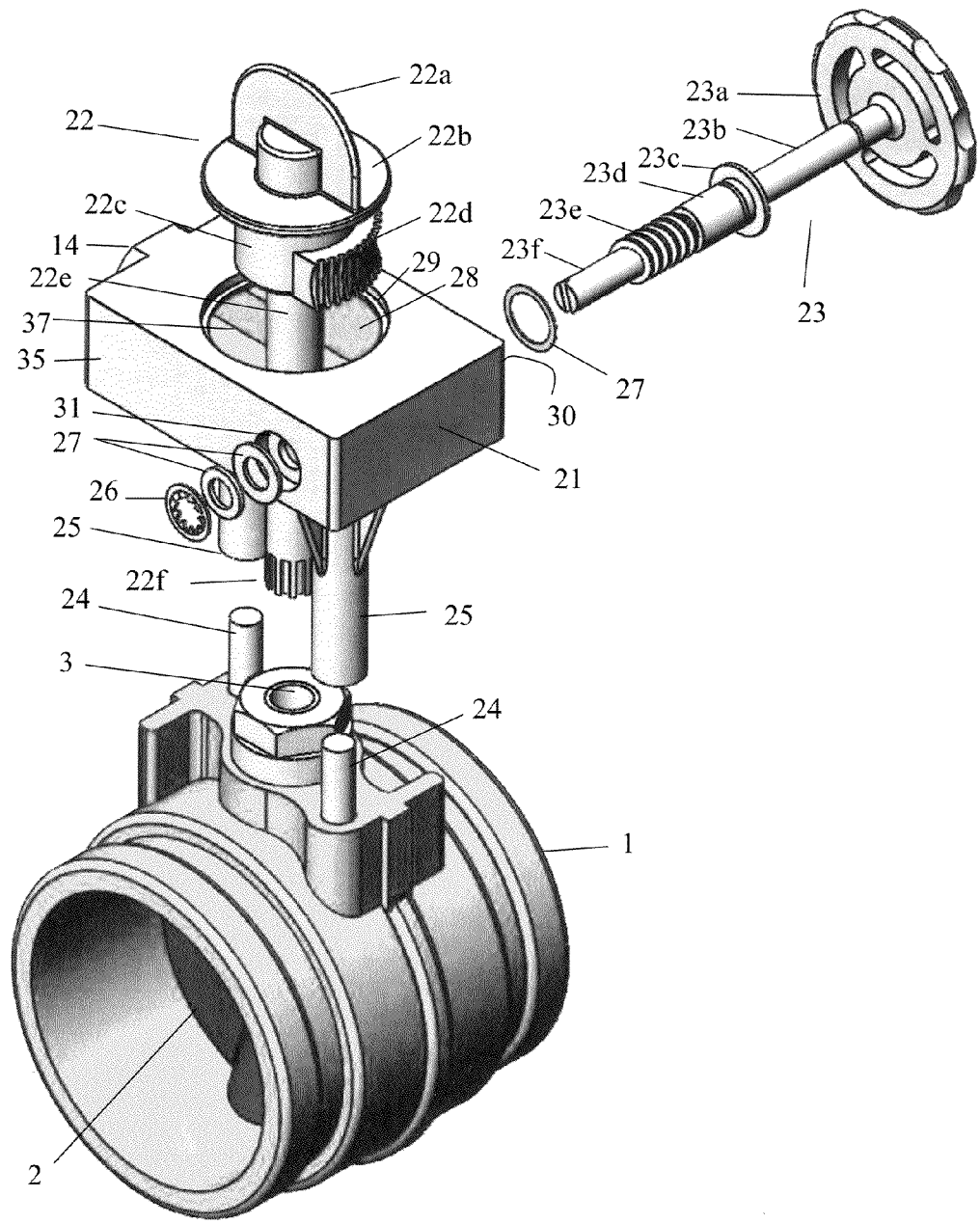
FIG. 2 shows an exploded perspective view of a butterfly valve with the actuator of the invention.

FIGS. 2 through 7 show various views of the actuator of the invention and its component parts. The valve 1 and disc 2 are conventional, and do not form part of the invention, but are shown in the figures to illustrate how the invention works in cooperation with the valve. It will be understood that the actuator of the invention is equally useful with other quarter-turn valves such as ball or plug valves or the like.

The actuator of the invention reduces the number of major parts in the actuator down to three—a stem 22, a handle 23 and a gearbox 21.

Figure 3:
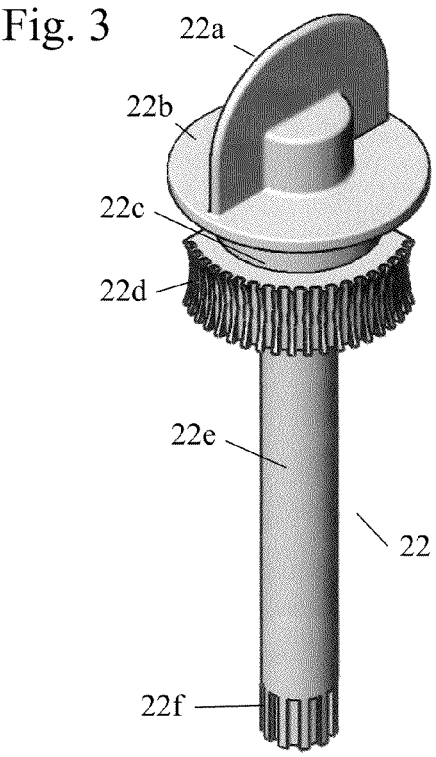
FIG. 3 shows a perspective view of the actuator stem of the invention.
Figure 5:
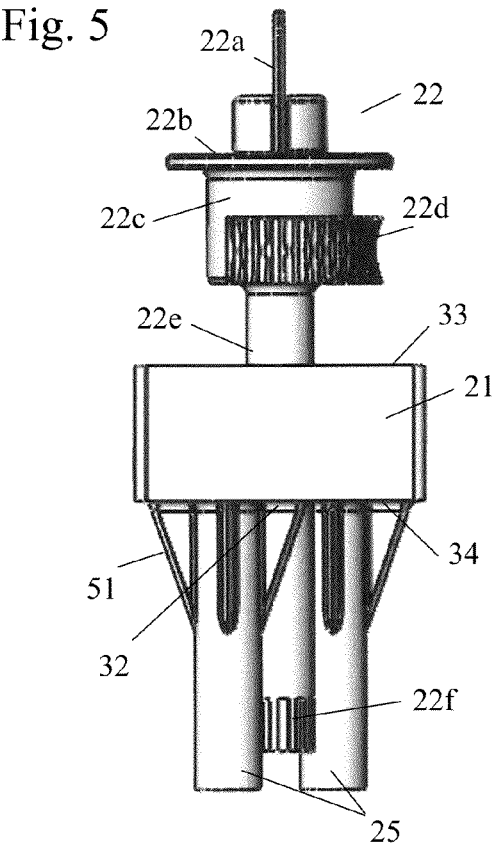
FIG. 5 shows a side view of the gearbox and actuator stem of the invention, with the stem partially removed from the gearbox.

FIG. 3 shows a perspective view of the stem 22. The stem 22 is integrally formed as a single piece, preferably by investment ("lost wax") casting. The parts of the stem 22 are, from upper to lower ends, the indicator 22a, a seal disc 22b, a worm portion 22c bearing worm gear 22d, and a stem shaft 22e having splines 22f on its lower end for press-fitting into a bore in the valve disc 2. The splines 22f do not necessarily match splines in the disc, but preferably just make the press-fit into the bore bite more.

Figure 4:
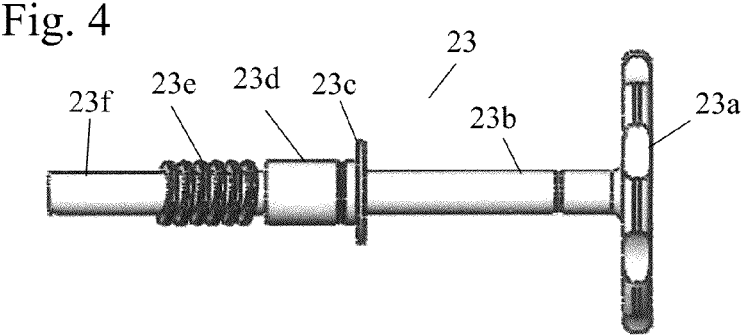
FIG. 4 shows a side view of the handle of the invention.
Figure 6:
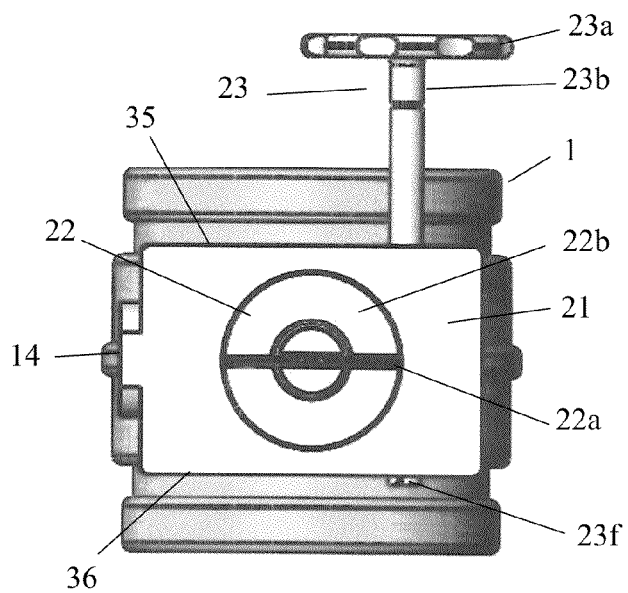
FIG. 6 shows a top view of the actuator of the invention installed on a butterfly valve.
Figure 7:
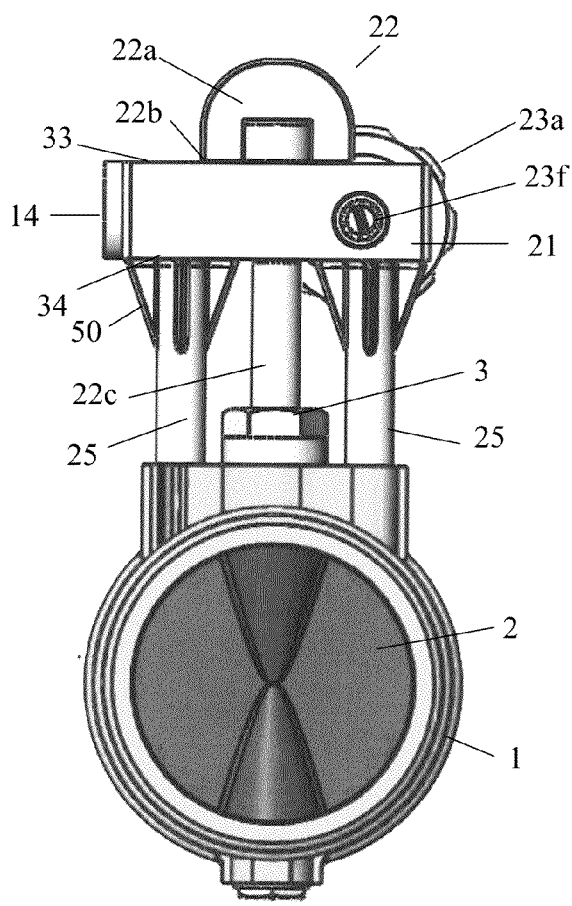
FIG. 7 shows a front view of the actuator of the invention installed on a butterfly valve.

FIG. 4 shows a side view of the handle 23. The handle 23 is also formed as a single piece, preferably by investment ("lost wax") casting. The parts of the handle 23, from right to left, are the knob 23a, the outer shaft portion 23b, a seal disc 23c, an intermediate portion 23d, a worm 23e, and an end portion 23f. The end portion 23f may be formed with a driver slot as shown in the figures, as desired.

The gearbox 21 is likewise formed as a single piece, preferably by investment ("lost wax") casting. A hole or opening 28 is formed in an upper surface 33 of the gearbox 21 with a lip 29 which forms a seal with seal disc 22b of the stem 22, to retain lubricant in the gearbox 21. As such, the seal disc 22b functionally replaces the cover 10 in prior art valve actuators. A hole 32 (not shown), aligned with hole 28, would be provided on the lower surface 34 of the gearbox 21 as well, to allow the stem 22 to pass through hollow interior 37 of the gearbox 21. The lower side of the worm portion 22c would seal this lower hole 32 to retain lubricant in the gearbox 21. Similarly, a hole 30 (not seen) is formed in a first side 35 of the gearbox 21 for the handle 23. This hole 30 is formed with a lip to form a seal with the seal disc 23c of the handle 23. Another hole 31 is formed on a second side 36, aligned with hole 30, so that the handle 23 can pass through hole 30, through the gearbox 21, and out hole 31. As is conventional, a threaded hole 14 can be formed in the gearbox 21 for the valve position sensor.

The gearbox 21 could be designed to attach to the valve using a conventional bracket 5 and bolts 4, as shown in FIG. 1, but in the preferred embodiment shown in FIGS. 2 through 7, even those parts are eliminated. Instead, the gearbox 21 is formed with cylindrical posts 25 which have recesses in their lower ends to slip over pins 24. The pins 24 can be threaded to screw into the same holes as the conventional bolts 4, or they could be press-fit into holes as desired. By sliding the posts 25 over the pins 24, the gearbox 21 is quickly and easily mounted to the valve 1. If desired, braces 51 can be formed to strengthen the posts 25.

The actuator of the invention in this embodiment is quickly and easily assembled by the steps of:

Slipping the posts 25 over the pins 24 on the valve 1.

Inserting the stem 22 through the gearbox 21 and pushing the splines 22f into a bore in the valve disc 2 (or other valve component). The stem 22 and gearbox 21 are now firmly attached to the valve 1 and the stem 22 now holds down all the actuator parts, eliminating need for fasteners.

Inserting the handle 23 through the gearbox 21, until seal disc 23c fits into its seat and the worm 23e is engaged with the worm gear 22d on the stem 22.

Fastening the end 23f of the handle 23 in the gearbox 21. This can be done using conventional means such as toothed washer 26 slipping over the end 23f. Flat washers 27 may be used to facilitate rotation and shim the handle position, as is conventional.

Where the terms "upper" and "lower" are used herein with reference to the gearbox or stem of the actuator, that "lower" is intended to mean that part which is closest to the valve, and "upper" means that part which is furthest from the valve. It will be understood that if the valve is mounted vertically or with the actuator underneath, the terms "upper" and "lower" are meant as defined herein, and no strict spatial directionality is intended to be implied by these terms.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An actuator for butterfly valves, comprising:
   a) a gearbox having an upper surface, a lower surface, a first side surface and an opposing second side surface, and a hollow interior;
   b) a stem passing through a hole in the upper surface of the gearbox, through the hollow interior, and through a hole in the lower surface of the gearbox, comprising, arranged axially along the stem from an upper end to a lower end:
      a seal disc for sealing the hole in the upper surface of the gearbox;
      a worm assembly with a worm gear; and
      a stem shaft having a lower end for inserting into and actuating the valve;
      the stem being integrally formed as a single piece,
   c) a handle passing through a hole in the first side surface of the gearbox, through the hollow interior, and through a hole in the second side surface of the gearbox, comprising, arranged axially along the stem from a first end to a second end:
      a knob;
      an outer shaft portion;
      a seal disc;
      an intermediate portion;
      a worm; and
      an end portion;
      the handle being integrally formed as a single piece; and
   d) a valve attachment on the lower surface of the gearbox.

2. The actuator of claim 1, in which the stem is formed by investment casting.

3. The actuator of claim 1, in which the handle is formed by investment casting.

4. The actuator of claim 1, in which the gearbox is formed by investment casting.

5. The actuator of claim 1 in which the stem further comprises a valve position indicator on the upper end of the stem.

6. The actuator of claim 1 in which the lower end of the stem shaft comprises a spline for press-fitting into a bore in a valve element.

7. The actuator of claim 1 in which the end portion of the handle has a driver slot.

8. The actuator of claim 1 in which the valve attachment comprises a bracket held to the lower surface of the gearbox by fasteners.

9. The actuator of claim 1 in which the valve attachment comprises a plurality of posts formed on the lower surface of the gearbox, each post having a central recess for receiving a pin.

* * * * *